(12) United States Patent
Goma et al.

(10) Patent No.: US 7,667,867 B2
(45) Date of Patent: Feb. 23, 2010

(54) PRINTING APPARATUS AND CORRECTION DATA GENERATING METHOD

(75) Inventors: Tatsuji Goma, Wakayama (JP); Yoshiyuki Nakatani, Wakayama (JP); Takeshi Nishihara, Wakayama (JP)

(73) Assignee: Noritsu Koki Co., Ltd., Wakayama-Shi (JP)

( * ) Notice: Subject to any disclaimer, the term of this patent is extended or adjusted under 35 U.S.C. 154(b) by 736 days.

(21) Appl. No.: 11/403,776

(22) Filed: Apr. 13, 2006

(65) Prior Publication Data

US 2006/0232835 A1    Oct. 19, 2006

(30) Foreign Application Priority Data

Apr. 15, 2005   (JP) .............................. 2005-118320

(51) Int. Cl.
*H04N 1/46* (2006.01)

(52) U.S. Cl. .................. 358/1.4; 358/3.06; 358/3.24; 358/504

(58) Field of Classification Search .................. 358/1.4, 358/3.01, 3.06, 3.1, 3.21, 3.24, 504, 518; 382/167; *H04N 1/46*
See application file for complete search history.

(56) References Cited

U.S. PATENT DOCUMENTS

| 6,292,209 | B1 * | 9/2001 | Nakamura et al. | 347/236 |
| 7,324,238 | B2 * | 1/2008 | Inoue | 358/1.9 |
| 7,508,546 | B2 * | 3/2009 | Shimoji et al. | 358/1.9 |
| 2003/0210412 | A1 * | 11/2003 | Ishibashi | 358/1.9 |

FOREIGN PATENT DOCUMENTS

| JP | 10-329381 | 12/1998 |
| JP | 2001-142162 | 5/2001 |

* cited by examiner

*Primary Examiner*—James A Thompson
(74) *Attorney, Agent, or Firm*—Fulbright & Jaworski LLP (57) ABSTRACT

A printing apparatus for measuring proper density and generating correction data with high accuracy by eliminating influences of adjoining areas. A plurality of scanning coordinates SAx are set to a middle position in a primary scanning direction of each of pixel lines Q on a test chart. Scanning areas SA are set to positions where the scanning coordinates SAx intersect scanning coordinates SAy indicating numerous positions in a secondary scanning direction of the pixel lines Q. Density data of the scanning areas SA is averaged to generate correction data for updating a correction table.

6 Claims, 7 Drawing Sheets

PRINTING APPARATUS AND CORRECTION DATA GENERATING METHOD

FIELD OF THE INVENTION

The present invention to a printing apparatus and a correction data generating method for use in the printing apparatus.

DESCRIPTION OF THE RELATED ART

In an existing printing apparatus having the above construction, a test chart is created from printing paper serving as the photosensitive material exposed by the exposing head, a flatbed scanner reads line images from this test chart, and a correction table is set based on the density of exposed dot lines read. The correction table obtained in this way is used as data for correcting variations in the luminance of light emitting elements arranged on the exposing head. See Japanese Patent Publication "Kokai" No. 2001-142162 (paragraphs [0010] to [0030] and [0036], and FIGS. 1-15), for example.

In the prior art described in this publication, even numbers and odd numbers are assigned to fluorescent light emitting elements corresponding to the three primary colors of R (red), G (green) and B (blue) constituting a fluorescent print head (corresponding to the exposing head of this invention). These fluorescent light emitting elements are controlled to expose printing paper, thereby to create a test print sheet (corresponding to the test chart of this invention). The test print sheet has a plurality of test exposed dot lines formed thereon and corresponding to the fluorescent light emitting elements having the even numbers and odd numbers assigned thereto. Then, density is determined of middle positions in a primary scanning direction of the exposed dot lines (i.e. direction of width of the exposed dot lines) acquired by a flatbed scanner, which middle positions are present at predetermined intervals in a secondary scanning direction. Further, an average value of density data in a check window is regarded as a representative density, and a correction coefficient for each fluorescent light emitting element is generated from the representative density and stored in a correction table.

In the above conventional technique, information is acquired from the test print sheet with the flatbed scanner, and densities are acquired from pixels present in the secondary scanning direction and on virtual center lines set to the middle positions in the primary scanning direction of the exposed dot lines (i.e. direction of width of the exposed dot lines). A correction table is set from average values of the densities of the plurality of locations acquired in this way.

However, the conventional technique, which samples only the pixels present on the virtual center lines, as seen from FIG. 9 of the above noted publication, may sample also pixels displaced from the middle positions in the primary scanning direction. Thus, there is a possibility of measuring improper density undergoing influences of areas adjoining the dot lines.

SUMMARY OF THE INVENTION

An object of the present invention is to provide a printing apparatus with an improved construction for eliminating influences of adjoining areas to measure proper density and generate correction data with high accuracy.

In accordance with an embodiment of the present invention, a printing apparatus comprises an exposing head, a scanner, correction data and generating means. The exposing head has a plurality of light control elements arranged in a primary scanning direction. The exposing head and a photosensitive material is movable relative to each other in a secondary scanning direction perpendicular to the primary scanning direction. The light control elements is controllable, during the relative movement of the exposing head and the photosensitive material based on set exposure data to generate a test chart. The scanner scans the test chart to acquire scanning data. The correction data generating means sets correction data to the light control elements based on the scanning data. The scanner has a resolution capable of acquiring density of a plurality of areas formed by dividing, in the primary scanning direction, each of pixel lines on the test chart corresponding to the respective light control elements. The processes performed by said correction data generating comprises a pixel identifying process, a density data acquiring process, and a correction data generating process. The pixel identifying process identifies the pixel lines corresponding to the light control elements from the scanning data. The density data acquiring process acquires density data of a plurality of areas adjacent a middle position in the primary scanning direction of each of the pixel lines, among the plurality of areas arranged in the primary scanning direction for each of the pixel lines identified in the pixel identifying process. The correction data generating process generates the correction data based on the density data acquired in the density data acquiring process.

With this construction, after acquiring scanning data with the scanner, the pixel line identifying process of the correction data generating means identifies the pixel lines on the test chart. Next, the density data acquiring process acquires density data of the plurality of areas arranged in the primary scanning direction in each pixel line. Then, the correction data generating process generates the correction data based on the density of the plurality of areas. As a result, influences of adjoining areas can be eliminated by generating correction data based on the density of the plurality of areas in a middle portion in the primary scanning direction (direction of width) of each pixel line. The printing apparatus can thus measure proper density and generate correction data with high accuracy.

In accordance with an embodiment of the present invention, the density data acquiring process can be performed for each of a plurality of scanning areas in different positions in the secondary scanning direction on the pixel lines and the correction data generating means generates the correction data by averaging density data of the plurality of scanning areas acquired by the density data acquiring process. With this construction, the density data acquiring process acquires density data from the plurality of scanning areas in different positions in the secondary scanning direction on the pixel lines. Correction data of high accuracy can be generated by performing the averaging process.

In accordance with an embodiment of the present invention, a total number of scanning areas can set a ratio of noise included in the density data of the pixel lines, to be at most a predetermined numerical value. A product of the number of areas arranged in the primary scanning direction and the number of the scanning areas can be set to a value at least equal to the total number of scanning areas. With this construction, noise can be reduced below a desired value by setting the product of the number of areas arranged in the primary scanning direction and the number of the scanning areas to a value equal to or exceeding the total number of scanning areas for reducing noise.

In accordance with an embodiment of the present invention, the light control elements can have even numbers and odd numbers assigned thereto along a direction of formation. The test chart can include an even-number pixel area having a plurality of pixel lines formed by exposure at the light control elements having the even numbers assigned thereto. An odd-number pixel area has a plurality of pixel lines formed by exposure at the light control elements having the odd numbers assigned thereto. An all-pixel area has a plurality of pixel lines formed by simultaneous exposure at the light control elements having the even numbers and the odd numbers assigned thereto. The pixel identifying process can be performed to identify the plurality of light control elements based on the pixel lines in the even-number pixel area or the odd-number pixel area of the test chart. The density data acquiring process can be set for acquiring density data of the pixel lines in the all-pixel area present on extensions in the secondary scanning direction of the pixel lines identified in the pixel identifying process based on the pixel lines in the even-number pixel area or the odd-number pixel area.

With this construction, the pixel identifying process identifies positions of the pixel lines formed by exposure to the plurality of light control elements having specific even numbers and odd numbers assigned thereto and identifies these light control elements based on the pixel lines in the even-number pixel area or the odd-number pixel area. Then, the density data acquiring process acquires density of the plurality of pixel lines in the all-pixel area formed by simultaneous exposure to the light control elements having the even numbers and the odd numbers assigned thereto. Thus, density is obtained with the influences of adjoining areas eliminated as much as possible.

In accordance with an embodiment of the present invention, the exposing head can comprise fluorescent light emitting tubes, each having a plurality of light emitting elements arranged in the primary scanning direction and capable of emitting light independently of one another. With this construction, the printing apparatus utilizes the exposing head comprising fluorescent light emitting tubes, each having a plurality of light emitting elements, correction data can be generated for application to the light emitting elements.

In accordance to an aspect of the present invention, a correction data generating method for use in a printing apparatus with an exposing head has a plurality of light control elements arranged in a primary scanning direction. The exposing head and a photosensitive material are moved relative to each other in a secondary scanning direction perpendicular to the primary scanning direction. A test chart is generated by controlling each of the light control elements of the exposing head during the relative movement of the exposing head and the photosensitive material, based on set exposure data. Correction data is set to each light control element from scanning data acquired by scanning the test chart with a scanner. The scanner has a resolution capable of acquiring density of a plurality of areas formed by dividing, in the primary scanning direction, each of pixel lines on the test chart corresponding to the respective light control elements. The method comprises the steps of identifying the pixel lines corresponding to the light control elements from the test chart acquired with the scanner, acquiring density data of a plurality of areas adjacent a middle position in the primary scanning direction of each of the pixel lines, among the plurality of areas arranged in the primary scanning direction of each of the pixel lines identified in the pixel identifying step and generating the correction data based on the density data determined in the density data acquiring step.

The pixel identifying step identifies the pixel lines corresponding to the light control elements from the test chart acquired with the scanner. Next, the density data acquiring step acquires density data of a plurality of areas arranged in the primary scanning direction of each of the pixel lines, and the correction data generating step is executed to generate the correction data based on the density data of the plurality of areas. As a result, influences of adjoining areas can be eliminated by generating correction data based on the density of the plurality of areas in a middle portion in the primary scanning direction (direction of width) of each pixel line. The correction data generating method can thus measure proper density and generate correction data with high accuracy.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENT

An embodiment of this invention will be described hereinafter with reference to the drawings.

Figure 1:
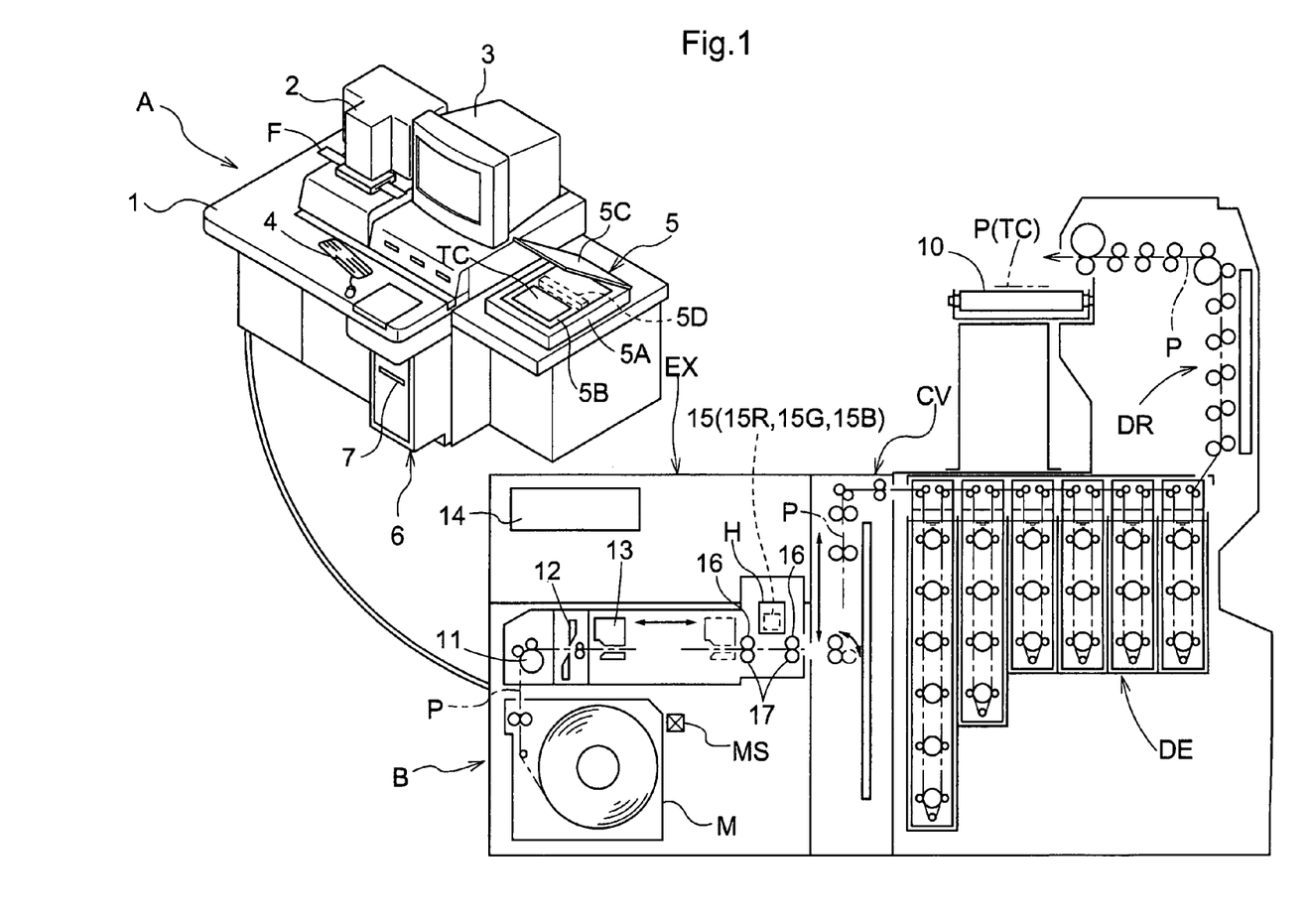
FIG. 1 is a view schematically showing a construction of a photo printing apparatus.

As shown in FIG. 1, a photo printing apparatus comprises an operating station A and a printing station B. The operating station A comprises a table 1 having, arranged on an upper surface thereof, a film scanner 2 for digitizing and reading image information on photographic film F, a display 3 for displaying process information, and a keyboard 4. A flatbed scanner 5 is disposed laterally of the table 1. A processing unit 6 in the form of a general-purpose computer is disposed under the table 1. The processing unit 6 has a media drive 7 for reading image data recorded on CD-Rs, DVD-Rs and the like, and image data recorded on semiconductor media.

The flatbed scanner 5 has a main body 5A defining a scanning table 5B formed of a transparent glass plate or resin plate, a platen cover 5C for openably covering the scanning table 5B, and a scan head 5D for making parallel movement inside the main body 5A.

The scan head 5D is shaped to extend in a primary scanning direction, and has a light source and photoelectric conversion elements such as CCDs. By moving the scan head 5D, with its light source emitting light, in a secondary scanning direction perpendicular to the primary scanning direction, the photoelectric conversion elements acquire the image of an object set to the scanning table 5B. The flatbed scanner 5 has a resolution capable of acquiring density of each of five or more areas formed by dividing, in the primary scanning direction, each of pixel lines Q (see FIG. 6) extending in the secondary scanning direction, which are formed on printing paper P by light emission from light emitting elements 18 described hereinafter.

In the printing station B, an exposing section EX exposes image data on printing paper P serving as photosensitive material and cut to a print size. After the exposure, a vertical transport device CV transports the printing paper P upward, as turned over, into a developing section DE. The printing paper P developed in the developing section DE is dried in a drying section DR, and is then fed horizontally onto a conveyer belt 10, and from the conveyer belt 10 out to a sorter (not shown).

In the exposing section EX, a pressure type feed roller 11 takes the printing paper P (an example of photosensitive materials) out of a paper magazine M. A cutter 12 cuts the printing paper P to the print size. A chucker 13 transports the printing paper P horizontally to an exposure position. While the printing paper P is transported in the exposure position horizontally in the secondary scanning direction, image data is exposed by light from an exposing head H. The exposing station EX has a control unit 14 mounted therein.

The exposing head H includes fluorescent light emitting tubes 15 (generic term for three types of fluorescent light emitting tubes 15R, 15G and 15B corresponding to the three primary colors) for emitting lights of R (red), G (green) and B (blue) downward. The exposing head H includes also a pair of exposing transport rollers 16 arranged upstream and downstream of the exposure position with respect to the direction of transport of the printing paper P, and driven rollers 17 opposed to the exposing transport rollers 16.

Figure 2:
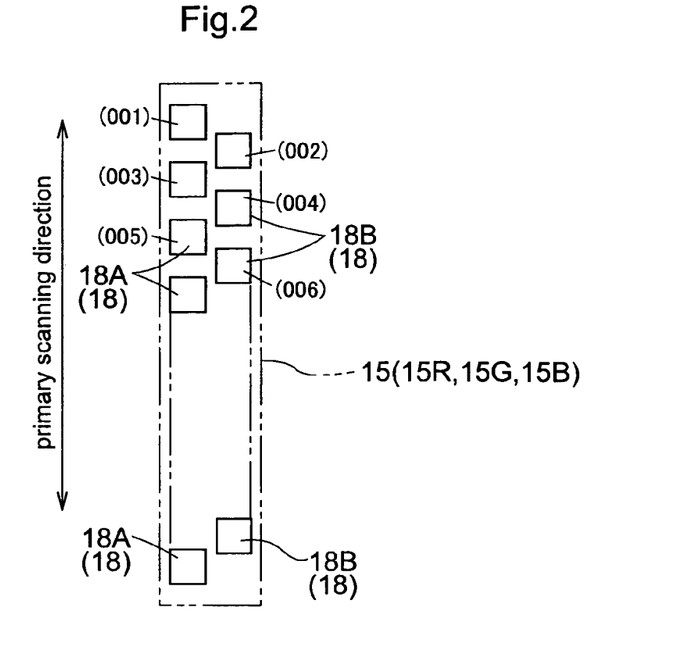
FIG. 2 is a view schematically showing an arrangement of light emitting elements.

This exposing head H has three types of fluorescent light emitting tubes 15R, 15G and 15B corresponding to the three primary colors of R (red), G (green) and B (blue), as described in the Japanese patent publication "Kokai" No. 2001-142162, which is incorporated herein by reference in its entirety. Each of the fluorescent light emitting tubes 15R, 15G and 15B includes a vacuum case having a light transmitting portion formed of transparent glass (not shown), for example. As shown in FIG. 2, the case has a plurality of light emitting elements 18 (an example of light control elements) arranged in a linear array along the primary scanning direction.

The three types of fluorescent light emitting tubes 15R, 15G and 15B emit lights of the three primary colors by passing lights from the light emitting elements 18 through filters (not shown) corresponding to R (red), G (green) and B (blue). These light emitting elements 18 have luminance thereof controllable by adjusting voltage applied to electrodes corresponding to the respective light emitting elements 18.

Figure 3:
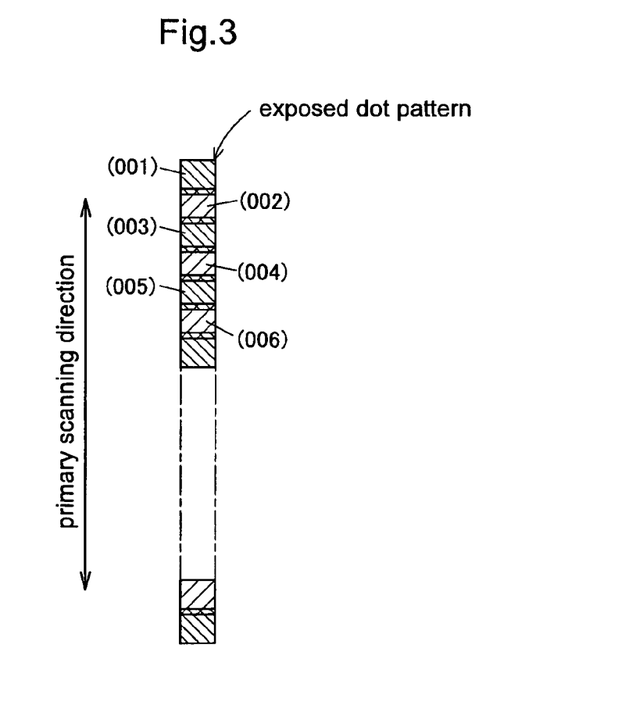
FIG. 3 is a view showing an exposed dot pattern.

The plurality of light emitting elements 18 are arranged in two parallel rows, one of which includes light emitting elements 18A having odd numbers assigned thereto as element numbers, and the other includes light emitting elements 18B having even numbers assigned thereto. The printing paper P may be exposed linearly in the primary scanning direction by controlling emission timing of the light emitting elements 18A having odd numbers assigned thereto as element numbers and the light emitting elements 18B having even numbers assigned thereto as element numbers. In this case, as shown in FIG. 3, exposed dots formed by light emitted from the light emitting elements 18A having odd numbers assigned thereto (i.e. exposed regions (pixels) with odd numbers in parentheses), and exposed dots formed by light emitted from the light emitting elements 18B having even numbers assigned thereto (i.e. exposed regions (pixels) with even numbers in parentheses), slightly overlap one another in the primary scanning direction.

The present invention employs an exposure system constructed, as described in the patent publication noted hereinbefore, for causing the lights of R (red), G (green) and B (blue) from the three types of fluorescent light emitting tubes 15R, 15G and 15B to irradiate positions different in the secondary scanning direction (to expose the same image data by staggering timing). Alternatively, optics such as mirrors may be used for causing the lights of R (red), G (green) and B (blue) from the three types of fluorescent light emitting tubes 15R, 15G and 15B to irradiate the same positions simultaneously.

In particular, the exposing head H may have light emitting diodes only for emitting red light, or light emitting diodes (an example of light control elements) for emitting all colors. Further, in the present invention, the exposing head H can comprise a plurality of shutters of the liquid crystal type (an example of light control elements) arranged along the primary scanning direction, in a path of light from the light source to the printing paper P, and these shutters may be operated to control the quantity of light for each pixel.

The vertical transport device CV has a transporting system for receiving, with pressure type rollers, the printing paper P exposed by the exposing head H, moving the printing paper P upward as turned over, and feeding the printing paper P into the developing section DE. In the developing section DE, rollers including pressure type rollers transport the printing paper P fed thereinto successively through a plurality of developing tanks to develop the printing paper P. In the drying section DR, the printing paper P is dried by heat from an infrared heater and drying air from a blower (not shown).

Figure 4:
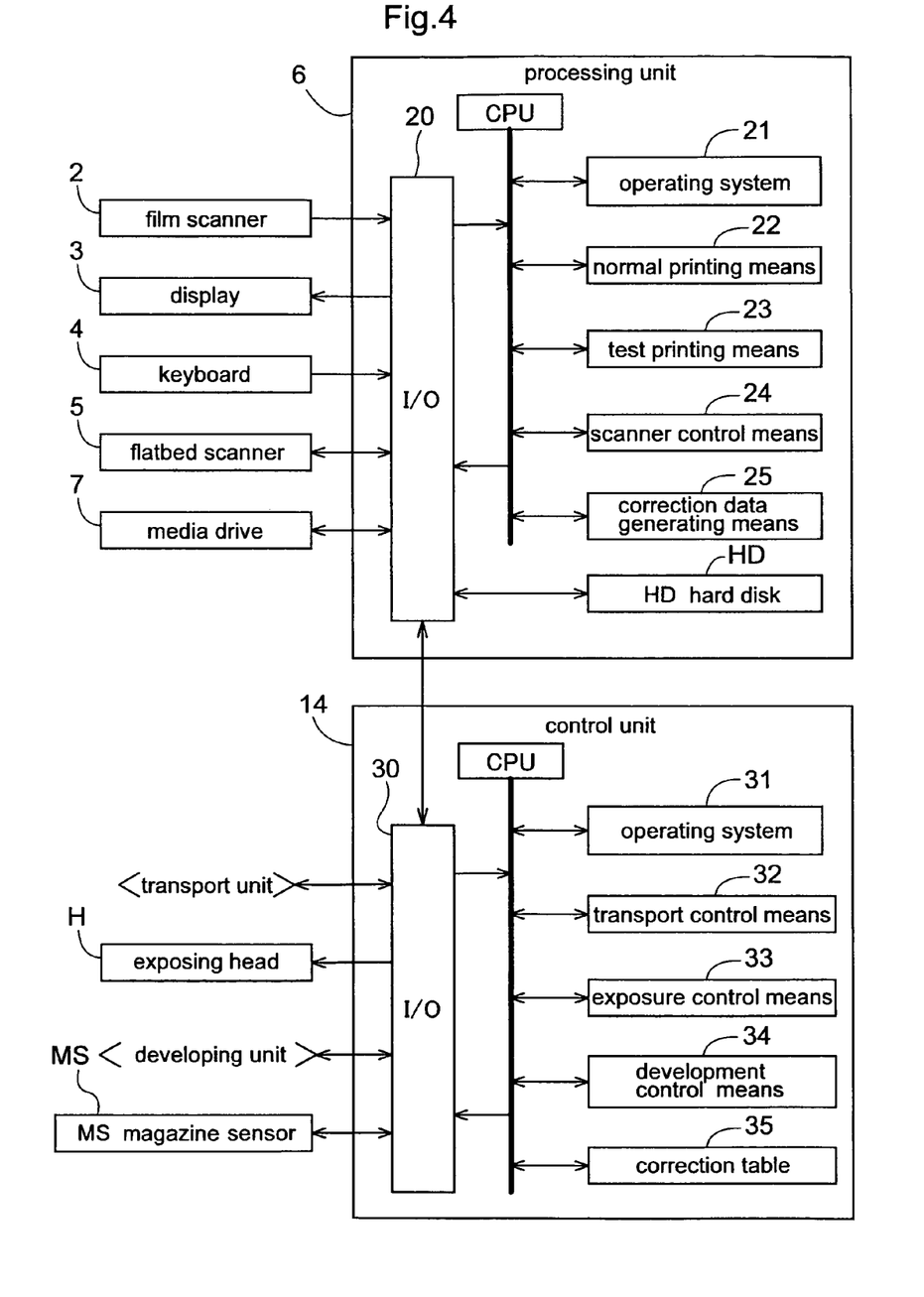
FIG. 4 is a block circuit diagram of a control system.

The photo printing apparatus has a control system which is depicted as shown in FIG. 4 in accordance with an exemplary embodiment of the present invention. Specifically, the processing unit 6 comprises a microprocessor (CPU), and an input/output interface 20 for inputting and outputting information to/from the microprocessor (CPU). An input/output system is provided for enabling the input/output interface 20 to communicate information with the film scanner 2, display 3, keyboard 4, flatbed scanner 5, media drive 7 and hard disk HD. An input/output system is provided also for enabling a data buss of microprocessor CPU to communicate information with an operating system 21, normal printing device 22, test printing device 23, scanner control device 24, and correction data generating means 25.

The operating system 21 displays on the display 3 information required by the processing unit 6. When, with the information displayed on the display 3, a normal printing process is carried out according to order data, for example, the operating system 21 acts as an interface for acquiring image data to be printed and the order and transferring the data to the normal printing device 22.

The normal printing device 22 transmits image data acquired from the film scanner 2 or media drive 7 and order data acquired through the keyboard 4 to the printing station unit B to perform a printing process. The test printing device 23 generates a test chart TC shown in FIG. 5, by transmitting data from a magazine sensor MS shown in FIG. 1, exposure data for chart creation and control data to the printing station B to print a chart on printing paper P based on the exposure data.

The scanner control device 24 controls the flatbed scanner 5 to acquire scanning data from a scanned object (e.g. printing paper P) set, and input the data to the processing unit 6. The correction data generating means 25 generates correction data from scanning data acquired by scanning the test chart TC with the flatbed scanner 5, and transmits this correction data to the printing station B for updating (or setting) a correction table 35 (see FIG. 4). Though not described in detail, a correction table 35 is set for each paper type, and a pertinent correction table 35 is updated based on a paper type determined from a code portion 40A (see FIG. 5) of the test chart TC.

The control unit 14 includes a microprocessor (CPU), and an input/output interface 30 for inputting and outputting information to/from the microprocessor (CPU). An input/output system is provided for enabling the input/output interface 30 to communicate information with a transport unit for transporting printing paper P in various parts of the printing station B, exposing head H, a developing unit for performing temperature control surface control of developers in the plurality of developing tanks of the developing section DE, and the magazine sensor MS for determining a type of paper magazine M. An input/output system is provided also for enabling a data buss of microprocessor CPU to communicate information with an operating system 31, a transport control device 32, an exposure control device 33, a development control device 34 and correction table 35.

The operating system 31 performs a process of acquiring signals from a sensor system (not shown), a basic process of outputting control signals to various control systems, and controls operations of the transport control device 32, exposure control device 33 and development control device 34. The transport control device 32 controls the transport unit for transporting printing paper P. The exposure control device 33 controls the exposing head H for exposing image data on the printing paper P. The development control device 34 controls temperature and surface level of processing liquids in the developing section DE. The correction table 35 realizes a process setting luminance levels of the light emitting elements 18 of the respective fluorescent light emitting tubes 15R, 15G and 15B in the exposing head H.

The operating system 21, normal printing device 22, test printing device 23, scanner control device 24 and correction data generating means 25 of the processing unit 6, and the operating system 31, transport control device 32, exposure control device 33 and development control means 34 of the control unit 14, are in the form of software stored in semiconductor memory (not shown). However, these components may be in the form of hardware such as logic, or may be a combination of software and hardware. The control system requires, besides the data buses, a control bus, an address bus and so on to realize control. To avoid complication, the control bus, address bus and interfaces are not shown in the drawings.

In accordance with an embodiment of the present invention, the photo printing apparatus is constructed to be capable of correcting, with high accuracy, variations in luminance of the light emitting elements 18 of the fluorescent light emitting tubes 15R, 15G and 15B of the exposing head H based on correction data included in the correction table 35. When performing this luminance correction, the test printing device 23 is operated to expose exposure data set beforehand on printing paper P to create the test chart TC shown in FIG. 5. By scanning this test chart TC with the flatbed scanner 5, the correction data generating means 25 generates correction data to update the correction data of the correction table 35.

When generating the test chart TC, the exposure control device 33 takes in the correction data of the correction table 35 already set, and transmits exposure data as changed by the correction data to the exposing head H to execute an exposing process. The exposed printing paper P is transported to the developing section DE to be developed, and is then dried in the drying section DR, thereby forming the test chart TC.

Figure 5:
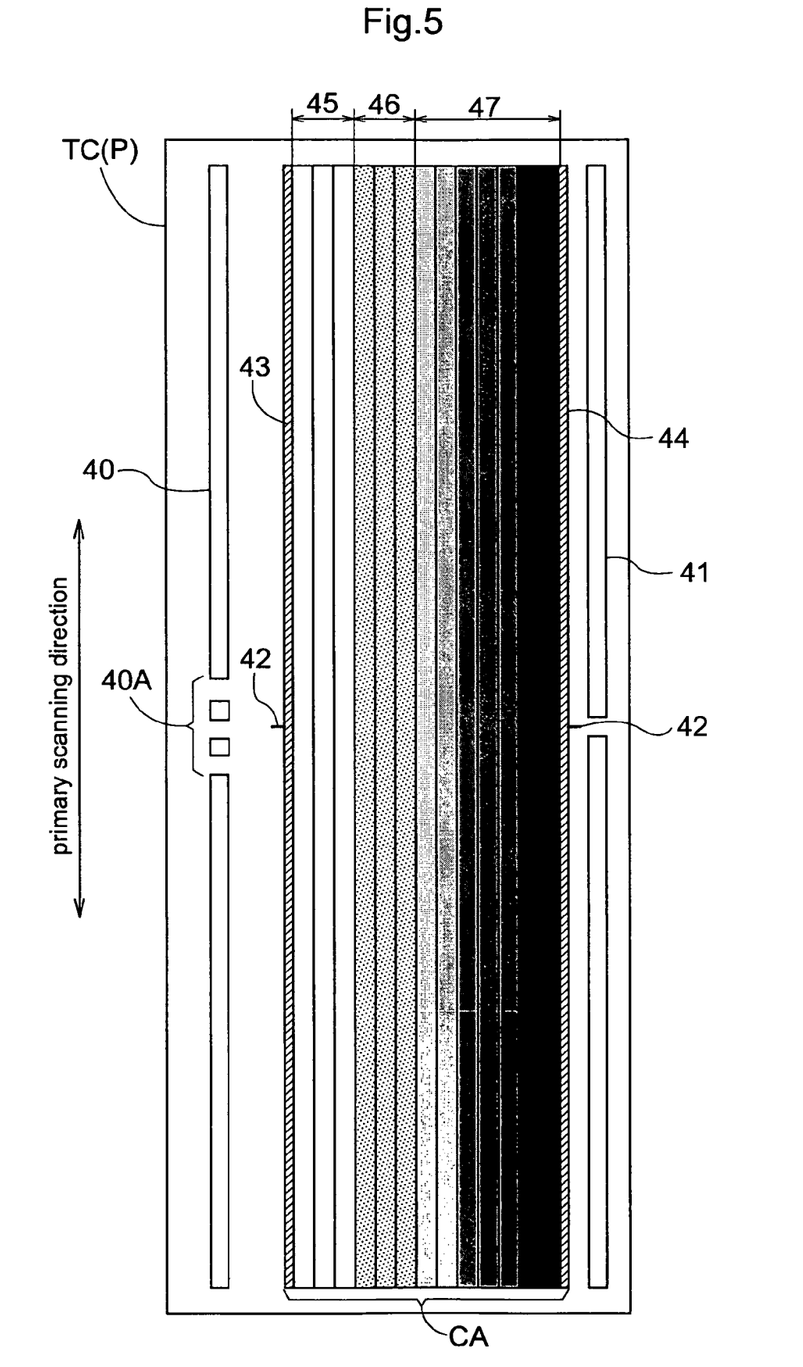
FIG. 5 is a view showing a test chart.

As shown in FIG. 5, the test chart TC has the code portion 40A formed thereon indicating a paper type. The test chart TC further comprises a start bar 40 serving as an index showing a front part of the chart, an end bar 41 showing a rear part of the chart, and a chart area CA formed in a region between the start bar 40 and end bar 41. Though processing is not described, the code portion 40A on the start bar 40 showing a paper type is what is selected as image data that corresponds to the type of printing paper P identified based on the information from the magazine sensor MS.

Center indices 42 are formed in middle positions in the primary scanning direction on a front side and a rear side of the chart area CA. On the front side and rear side of the chart area CA, a pixel line portion 43 is formed by light emission only from the light emitting elements 18A having odd numbers assigned thereto, and a pixel line portion 44 is formed by light emission only from the light emitting elements 18B having even numbers assigned thereto.

Figure 6:
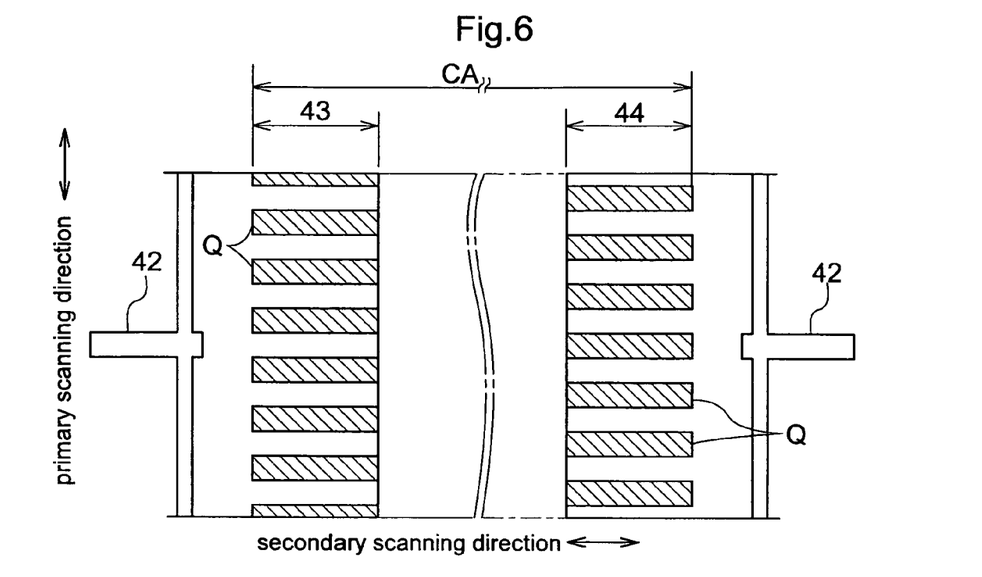
FIG. 6 is an enlarged view showing a structure of the test chart.

The pixel line portions 43 and 44 may be depicted in enlargement as shown in FIG. 6. As seen, the pixel line portion 43 includes a plurality of pixel lines Q formed by light emission from the light emitting elements 18A having odd numbers assigned thereto, and arranged in parallel in the form of comb teeth. The pixel line portion 44 includes a plurality of pixel lines Q formed by light emission from the light emitting elements 18B having even numbers assigned thereto, and arranged in parallel in the form of comb teeth. These pixel lines Q have a width in the primary scanning direction equal to the width of pixels.

The chart area CA comprises a primary color area 45 formed in the hues of yellow (Y), magenta (M) and cyan (C) by lights emitted independently of one another from the light emitting elements 18 of the three types, B (blue), G (green) and R (red), of fluorescent light emitting tubes 15B, 15G and 15R, a false coloring area 46 for checking coloring of printing paper P by emitting a particular color light in time of the above light emission, and a gray coloring area 47 having a plurality of tones produced by lights emitted simultaneously in a fixed quantity from the light emitting elements 18 of the three types, B (blue), G (green) and R (red), of fluorescent light emitting tubes 15B, 15G and 15R. It will be noted that the primary color area 45, false coloring area 46 and gray coloring area 47 correspond to an entire pixel area.

In accordance with an embodiment of the present invention, the photo printing apparatus has a characterizing feature in that the test chart TC is generated, the correction data generating means 25 generates correction data automatically by setting the test chart TC to the flatbed scanner 5 and scanning it, and automatically and properly updates (or sets) the correction data on the correction table 35.

The scanning data acquired by scanning the test chart TC set to the flatbed scanner 5 comprises the three types of data corresponding to the three primary colors of R (red), G (green) and B (blue). These three types of data comprises coordinates (addresses to be strict) showing areas according to resolution, and 8-bit data showing density for the respective coordinates.

Figure 8:
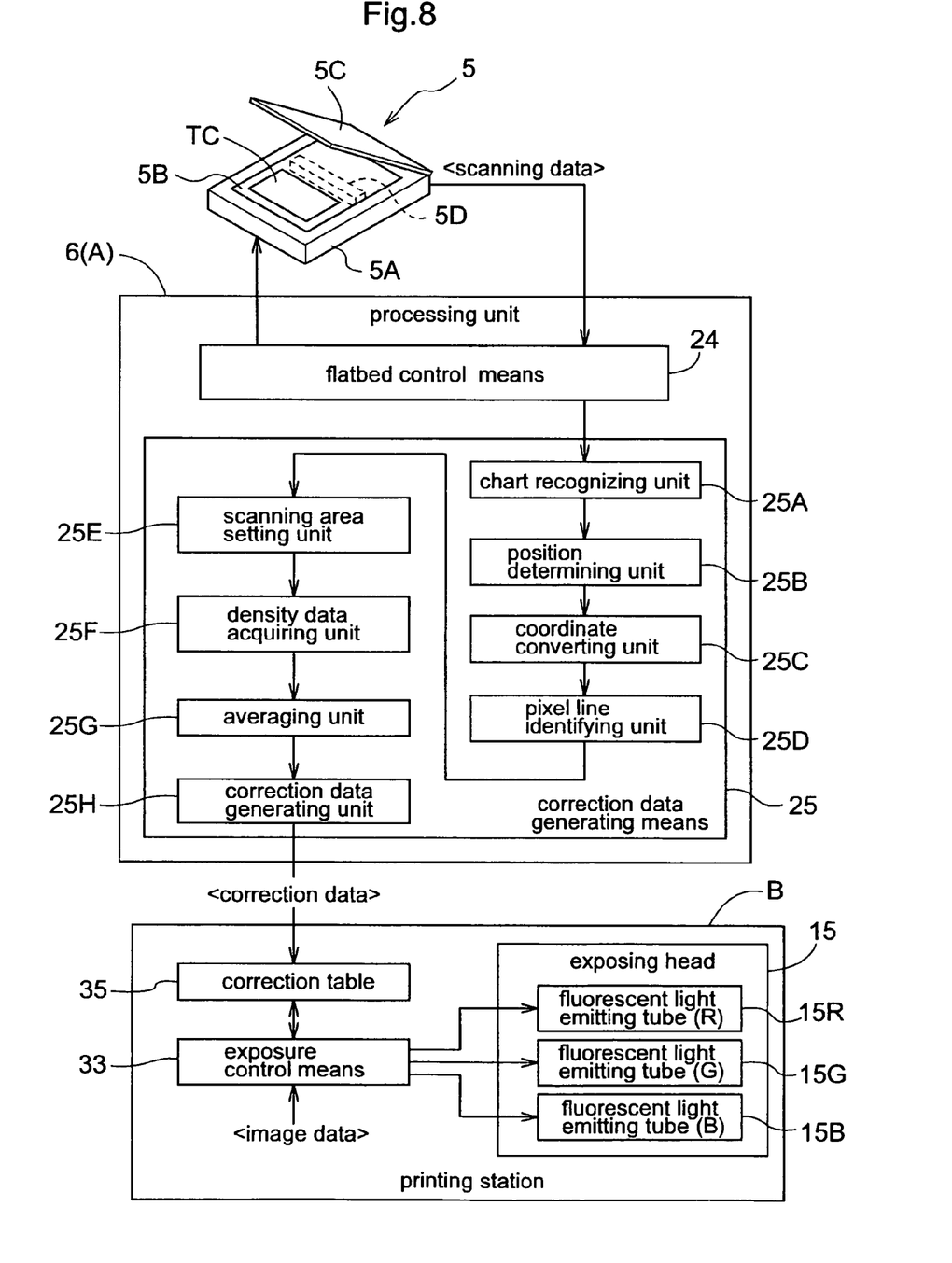
FIG. 8 is a view showing an outline of a processing sequence.

As shown in FIG. 8, the correction data generating means 25 includes a chart recognizing unit 25A, a position determining unit 25B, a coordinate converting unit 25C, a pixel line identifying unit 25D, a scanning area setting unit 25E, a density data acquiring unit 25F, an averaging unit 25G and a correction data generating unit 25H, all in the form of software.

Among the plurality of processing units noted above, the process carried out by the pixel line identifying unit 25D corresponds to the pixel identifying process and pixel identifying step, the process carried out by the density data acquiring unit 25F corresponds to the density data acquiring process and density data acquiring step, and the process carried out by the correction data generating unit 25H corresponds to the correction data generating process and correction data generating step.

An outline of a process of updating the correction table 35 will be described with reference to FIG. 8. After the test chart TC is generated as noted above, a mode is selected for the processing unit 6 to update the correction data of the correction table 35. The test chart TC is set to the flatbed scanner 5, and the scanner control device 24 controls the flatbed scanner 5 to acquire scanning data, and transmits the scanning data to the correction data generating means 25.

The scanning data includes coordinate data of pixel positions for the three primary colors of R (red), G (green) and B (blue), and has a data structure with density data corresponding to the coordinate data. The process described hereinafter is carried out similarly for all the three types of density data corresponding to the three primary colors of R (red), G (green) and B (blue).

In the correction data generating means 25, the chart recognizing unit 25A extracts a chart included in the scanning data. The position determining unit 25B determines the position of the chart with reference to the primary scanning direction of the scanning data. The coordinate converting unit 25C performs a coordinate conversion process for adjusting the position.

More particularly, since the start bar 40 and end bar 41 are formed to extend along the primary scanning direction of the exposing head H, the pixel lines Q extend parallel to the secondary scanning direction. Thus, an adjustment of the extending direction of the pixel lines Q to coincide with the primary scanning direction or secondary scanning direction of the flatbed scanner 5 facilitates a process of setting scanning areas SA described hereinafter.

Since the start bar 40 and end bar 41 are formed on the test chart TC to extend parallel to the primary scanning direction of the exposing head H, the position determining unit 25B determines the position (angle of inclination) of at least one of the start bar 40 and end bars 41 with respect to the primary scanning direction (or the secondary scanning direction) of the scanning data. After the position is determined, the coordinate converting unit 25C performs a coordinate conversion for rotating the scanning data to bring the start bar 40, for example, into agreement with the primary scanning direction of the flatbed scanner 5.

The process carried out by the coordinate converting unit 25C is not required, and is omitted, when the primary scanning direction of the test chart TC is in agreement with the primary scanning direction or secondary scanning direction of the scanning data. As a processing mode of coordinate converting unit 25C, for example, a scanning coordinate system (that, in the initial state, has a vertical direction and a horizontal direction in agreement with the primary scanning direction and secondary scanning direction of the exposing head H) may be generated for determining scanning areas described hereinafter, the position of the scanning coordinate system being rotated by an angle corresponding to the position (angle of inclination), without rotating the scanning data, thereby to set coordinate conversion parameters for the states before and after the rotation. The scanning data having a proper position may be produced by simulation using these conversion parameters.

Next, the pixel line identifying unit 25D extracts positions of the pixel lines Q in the pixel line portions 43 and 44, and determines a correspondence between the plurality of pixel lines Q and the light emitting elements 18 (18A, 18B) from a relative positional relationship with the center indices 42.

That is, when identifying the pixel lines Q, density data in the primary scanning direction of the pixel line portions 43 and 44 on the test chart TC is sampled, and areas with high density are identified as the pixel lines Q. Further, the element numbers of corresponding light emitting elements 18 (18A, 18B) are applied to the respective pixel lines Q based on the relative positional relationship in the primary scanning direction between the pixel lines Q identified and the indices.

Figure 7:
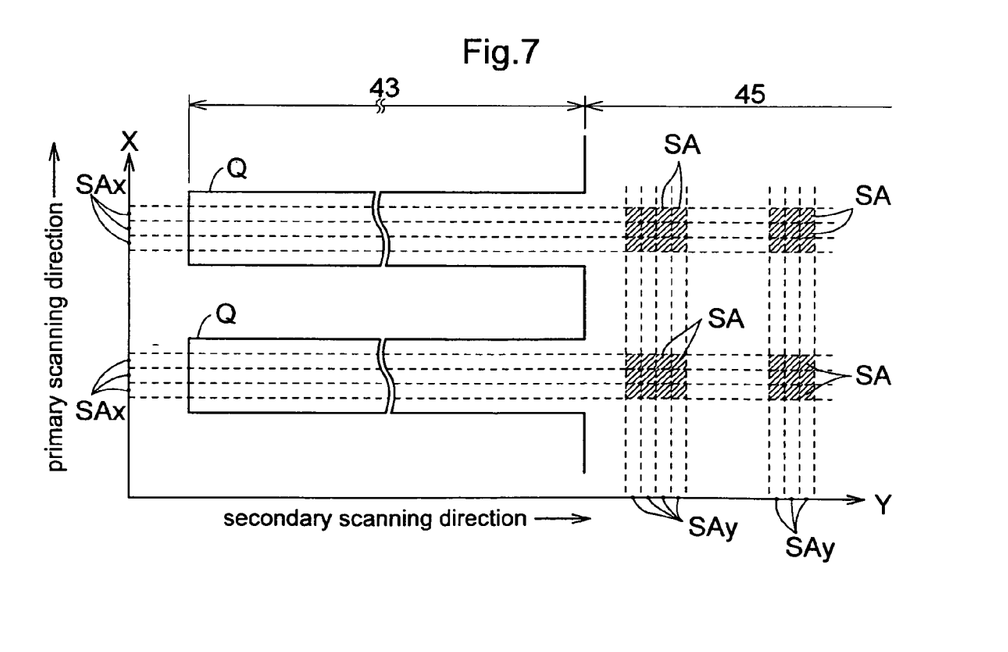
FIG. 7 is an enlarged view showing scanning regions.

Next, the scanning area setting unit 25E sets scanning coordinates SAx in the primary scanning direction (X direction in FIG. 7) to middle positions in the primary scanning direction of pixel lines Q, and sets scanning coordinates SAy to each of the three primary color area 45, false coloring area 46 and gray coloring area 47 in the secondary scanning direction (Y direction in FIG. 7). Intersections of lines passing through the scanning coordinates SAx in the primary scanning direction and extending in the secondary scanning direction and lines passing through the scanning coordinates SAy in the secondary scanning direction and extending in the primary scanning direction are designated as scanning areas SA.

Figure 9:
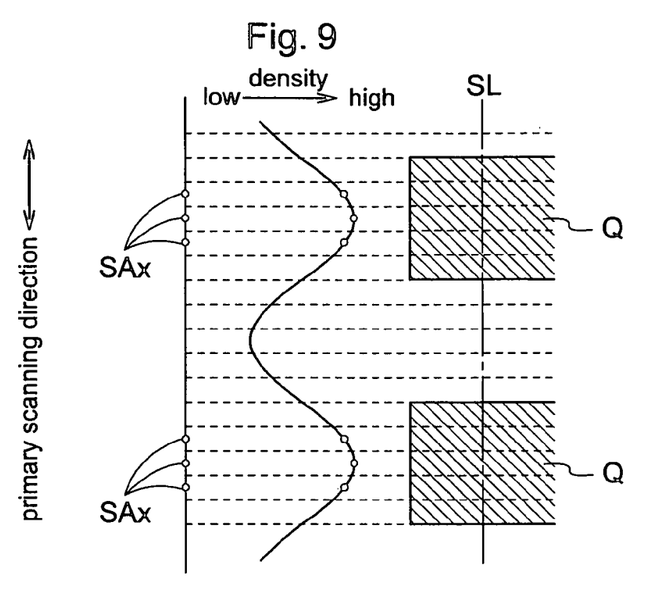
FIG. 9 is a view showing a relationship between pixel line and measured density.

More particularly, the scanning data in the primary scanning direction of the pixel line portions 43 and 44 is such that, as shown in FIG. 9, for example, density data of the intersections of the plurality of pixel lines Q with a sampling line SL, shown as density data in FIG. 9, is the highest in middle positions in the primary scanning direction of the pixel lines Q, and the lowest in middle positions in the primary scanning direction of areas where no pixel lines Q are present. This scanning data has a resolution that divides each pixel line Q into five areas in the primary scanning direction. Thus, for the reason noted above, the three areas at the middle in the primary scanning direction of the pixel lines Q are set as scanning coordinates SAx in the primary scanning direction.

As shown in FIG. 9, the scanning data in the primary scanning direction of the pixel line portions 43 and 44 changes in fixed cycles. When areas that do not change cyclically are encountered, it is conceivable that dust is adhering to the test chart TC or a misdetection has occurred. Thus, a processing mode may be set to proceed with the process on a determination that the pixel lines Q exist in areas from which high density data should be measured.

The scanning data (density data) has a noise ratio (amount of variation from a proper numerical value of the density data) of about 5%. In order to reduce this value of 5% to 0.5% or less (1/10 or less), based on $S(\%)/\sqrt{T}$ (number of samples)=U (%) (equation of convergence), $$5/\sqrt{T}=0.25$$

is calculated to derive 400 as the value of T. This value of 400 is a total of scanning areas SA. Variations in the density data are reduced by setting a value exceeding the total (number of samples) 400 of scanning areas SA.

Figure 10:
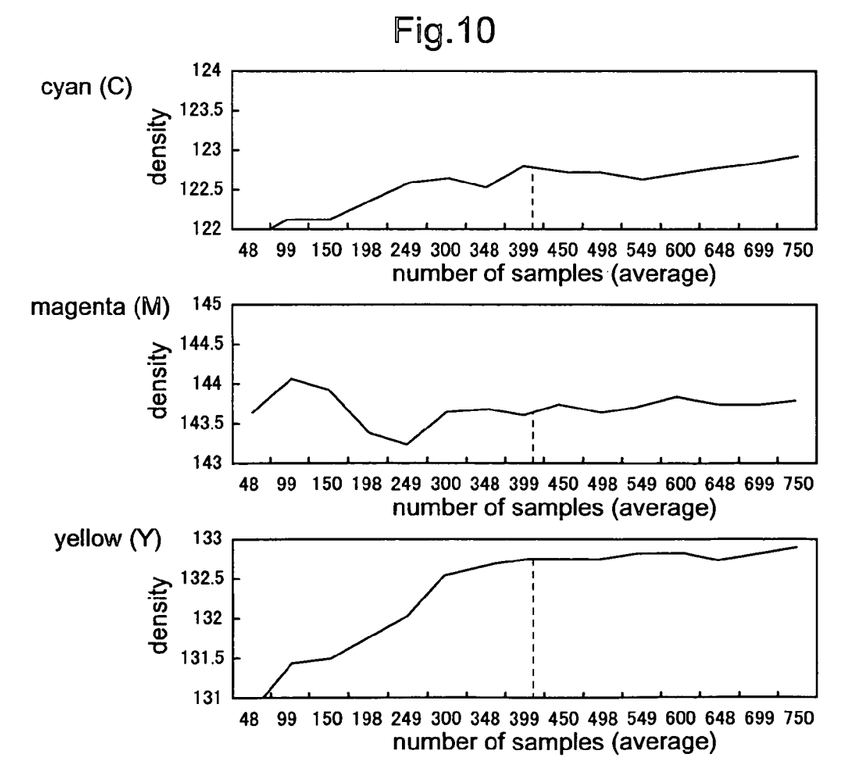
FIG. 10 shows graphs of a relationship between the number of samples and density data.

FIG. 10 shows graphs of a relationship between the number of samples and density data for each color of cyan (C), magenta (M) and yellow (Y), resulting from actual measurements. It will be seen from these graphs that, where the number of samples is less than 400, the smaller the number of samples is, the greater variations occur with the density data, and that the variations in the density data diminish and the density data settles in regions where the number of samples exceeds about 400. These graphs also show that the equation of convergence holds good.

For these reasons, the number of scanning coordinates SAy in the secondary scanning direction is set to about 140, and the scanning coordinates SAy are set to each of the three primary color area 45, false coloring area 46 and gray coloring area 47. While these scanning coordinates SAy are arranged in an adjoining positional relationship in the drawings, they may be arranged at predetermined intervals.

Next, the density data acquiring unit 25F acquires the density data of the scanning areas SA indicated by the scanning coordinates SAx, SAy in the primary scanning direction and secondary scanning direction. The averaging unit 25G averages the density data acquired, and stores averaged values with element numbers assigned thereto.

When the density data acquiring unit 25F acquires the density data of the scanning areas SA, a process may be carried out to designate successively the scanning coordinates SAy in the secondary scanning direction, and acquire successively the density data of the scanning areas SA (three areas) of the three scanning coordinates SAx in the primary scanning direction corresponding to the scanning coordinates SAy designated. Alternatively, and conversely to the above, a process may be carried out to designate successively the scanning coordinates SAx in the primary scanning direction, and acquire successively (three times) the density data of the scanning areas SA (about 140 areas) of the three scanning coordinates SAy in the secondary scanning direction corresponding to the scanning coordinates SAx designated.

Take the primary color area 45 for example, averaged density data of the pixel lines Q in the area of the hue of cyan (C) formed by the fluorescent light emitting tube 15R of R (red) is stored with information indicating the fluorescent light emitting tube 15R of R (red) and corresponding pixel numbers.

After the density data is stored for each of the light emitting elements 18 of the three types, R (red), G (green) and B (blue), of fluorescent light emitting tubes 15R, 15G, and 15B, the correction data generating unit 25H generates correction data (e.g. correction coefficient) for equalizing the density in the primary scanning direction. This correction data is stored in overwrite mode in the correction table 35.

Thus, according to this invention, correction data is generated based on the density of the scanning areas SA located at the middle in the primary scanning direction of the pixel lines Q formed on the test chart TC. In this way, the influences of adjoining pixel lines Q are eliminated or minimized. Particularly, by setting the number of these scanning areas SAs to a rational numerical value, the influence of noise included in the density data is eliminated to obtain exact density data. As a result, high-precision correction data is generated to set a proper correction table 35.

The present invention can be embodied as follows in addition to the foregoing embodiment:

(a) The exposing head of the printing apparatus may be constructed movable over a sensitized surface of a fixed photosensitive material. Such an exposing head has light control elements such as light emitting diodes arranged in the primary scanning direction, and is moved in the secondary scanning direction.

(b) The scanner may have a fixed scanning unit for acquiring images, and printing paper P is fed to the scanning unit. Further, the scanner may have a resolution for acquiring density data from a test chart with each pixel line divided into six or more areas in the primary scanning direction. By using the scanner having this resolution, correction data may be generated with increased accuracy.

The present invention is applicable also to a printing apparatus having a scanner for exclusive use in scanning the test chart, and a printing apparatus that develops a photosensitive material without using a developer.

What is claimed is:

1. A printing apparatus comprising:
   an exposing head comprising a plurality of light emitting elements arranged in a primary scanning direction whose luminance are separately controllable, said exposing head and a photosensitive material being movable relative to each other in a secondary scanning direction perpendicular to said primary scanning direction, said light emitting elements being controllable, during the relative movement of said exposing head and said photosensitive material, based on set exposure data to generate a test chart;
   a scanner for scanning said test chart to acquire scanning data; and
   a correction data generating means for setting correction data regarding the luminance of said light emitting elements based on said scanning data;
   wherein said scanner has a resolution capable of acquiring density of a plurality of areas formed by dividing, in the primary scanning direction, each of pixel lines on said test chart corresponding to the respective light emitting elements;
   wherein said correction data generating means performs:
   a pixel identifying process for identifying said pixel lines corresponding to said light emitting elements from said scanning data;
   a density data acquiring process for acquiring density data of a plurality of areas adjacent a middle position in the primary scanning direction of each of the pixel lines, among the plurality of areas arranged in the primary scanning direction for each of the pixel lines identified in said pixel identifying process; and
   a correction data generating process for generating said correction data based on the density data acquired in said density data acquiring process.

2. The printing apparatus of claim 1, wherein said density data acquiring process is performed for each of a plurality of scanning areas in different positions in the secondary scanning direction on said pixel lines, said correction data generating means being set to generate said correction data by averaging density data of said plurality of scanning areas acquired in the process performed by said density data acquiring process.

3. The printing apparatus of claim 2, wherein a total number of scanning areas is set, for setting a ratio of noise included in the density data of said pixel lines, to be at most a predetermined numerical value and a product of the number of areas arranged in said primary scanning direction and the number of said scanning areas is set to a value at least equal to said total number of scanning areas.

4. The printing apparatus of claim 1, wherein said light emitting elements have even numbers and odd numbers assigned thereto along a direction of formation; said test chart comprises an even-number pixel area having a plurality of pixel lines formed by exposure at the light emitting elements having the even numbers assigned thereto, an odd-number pixel area having a plurality of pixel lines formed by exposure at the light emitting elements having the odd numbers assigned thereto, and an all-pixel area having a plurality of pixel lines formed by simultaneous exposure at the light emitting elements having the even numbers and the odd numbers assigned thereto; said pixel identifying process is operable to identify said plurality of light emitting elements based on the pixel lines in said even-number pixel area or said odd-number pixel area of said test chart; and said density data acquiring process is operable to acquire density data of the pixel lines in said all-pixel area present on extensions in the secondary scanning direction of the pixel lines identified in said pixel identifying process based on the pixel lines in said even-number pixel area or said odd-number pixel area.

5. The printing apparatus of claim 1, wherein said exposing head comprises fluorescent light emitting tubes, each having a plurality of light emitting elements arranged in the primary scanning direction and capable of emitting light independently of one another.

6. A correction data generating method for use in a printing apparatus with an exposing head having a plurality of light emitting elements arranged in a primary scanning direction whose luminance are separately controllable, moving said exposing head and a photosensitive material relative to each other in a secondary scanning direction perpendicular to said primary scanning direction, generating a test chart by controlling each of the light emitting elements of said exposing head, during the relative movement of said exposing head and said photosensitive material, based on set exposure data, and setting correction data to regarding the luminance of each said light emitting element from scanning data acquired by scanning the test chart with a scanner;

wherein said scanner has a resolution capable of acquiring density of a plurality of areas formed by dividing, in the primary scanning direction, each of pixel lines on said test chart corresponding to the respective light emitting elements;

said method comprising the steps of:

identifying said pixel lines corresponding to said light emitting elements from said test chart acquired with said scanner;

acquiring density data of a plurality of areas adjacent a middle position in the primary scanning direction of each of the pixel lines, among the plurality of areas arranged in the primary scanning direction of each of the pixel lines identified in the step of identifying said pixel lines; and generating said correction data regarding the luminance based on the density data determined in the step of acquiring density data.

* * * * *

UNITED STATES PATENT AND TRADEMARK OFFICE
CERTIFICATE OF CORRECTION

PATENT NO.       : 7,667,867 B2  
APPLICATION NO.  : 11/403776  
DATED            : February 23, 2010  
INVENTOR(S)      : Goma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Seventh Day of December, 2010

David J. Kappos  
*Director of the United States Patent and Trademark Office*